United States Patent
Andre et al.

(10) Patent No.: US 6,874,035 B1
(45) Date of Patent: Mar. 29, 2005

(54) SYSTEM AND METHODS FOR TRANSFORMING DATA FROM A SOURCE TO TARGET PLATFORM USING SNAPSHOT

(75) Inventors: Jeffrey Andre, Denver, CO (US); Patrick J. Tomsula, Arvada, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 09/496,885

(22) Filed: Feb. 2, 2000

(51) Int. Cl.⁷ .............................................. G06F 15/16
(52) U.S. Cl. ................... 709/246; 709/201; 709/203; 709/212; 709/213; 709/310; 707/4; 707/200; 711/114; 711/118; 711/133
(58) Field of Search ................................. 709/201, 203, 709/213, 246, 310, 212; 707/10, 104.1, 200; 714/4; 713/201; 711/114, 162, 118, 133

(56) References Cited

U.S. PATENT DOCUMENTS

| | | | |
|---|---|---|---|
| 5,109,486 A | | 4/1992 | Seymour |
| 6,038,639 A | * | 3/2000 | O'Brien et al. ............ 711/114 |
| 6,061,770 A | * | 5/2000 | Franklin ................... 711/162 |
| 6,182,151 B1 | * | 1/2001 | Cheng et al. .............. 709/310 |
| 6,260,040 B1 | * | 7/2001 | Kauffman et al. ............ 707/10 |
| 6,266,774 B1 | * | 7/2001 | Sampath et al. ............ 713/201 |
| 6,282,548 B1 | * | 8/2001 | Burner et al. ............ 707/104.1 |
| 6,360,331 B2 | * | 3/2002 | Vert et al. ..................... 714/4 |
| 6,421,733 B1 | * | 7/2002 | Tso et al. .................. 709/246 |
| 6,438,586 B1 | * | 8/2002 | Hass et al. ................ 709/213 |
| 6,493,744 B1 | * | 12/2002 | Emens et al. .............. 709/203 |
| 6,564,228 B1 | * | 5/2003 | O'Connor .................. 707/200 |

FOREIGN PATENT DOCUMENTS

EP        0 339 221        11/1989

* cited by examiner

*Primary Examiner*—Hosain Alam
*Assistant Examiner*—Thu Ha Nguyen
(74) *Attorney, Agent, or Firm*—Wayne P. Bailey

(57) ABSTRACT

The invention transforms source data from a source platform to a target platform with a single copy. A data request signal is communicated from the target platform to the source platform and a location of the source data is determined in a disk subsystem supporting snapshot. The disk subsystem (i.e., a snapshot facility) copies the source data in raw form to one or more target disks designated by the target platform. The locations of the source data and the target disks are communicated to the target platform and the source data is read from the disk subsystem to transform the data to the target platform. The process starts from a request of an application resident within the target platform. One or more data management units can be used to determine source and target disk locations. Preferably, the source platform also communicates metadata to the target platform; and thus metadata, when available, is also copied via snapshot operations in the disk subsystem. The use of Snapshot creates a static copy to help ensure data integrity.

14 Claims, 3 Drawing Sheets

SYSTEM AND METHODS FOR TRANSFORMING DATA FROM A SOURCE TO TARGET PLATFORM USING SNAPSHOT

FIELD OF THE INVENTION

The invention relates to extracting data from one hardware platform for processing on a different hardware platform.

BACKGROUND OF THE INVENTION

When extracting data from one hardware platform (the "source platform") for processing on another hardware platform (the "target platform"), the data must be transformed into a format acceptable to the target platform. Typically this takes an undesirable amount of time, due to the copying, transformation processes, and size of the data. This situation is compounded by the fact that information integrity must be maintained while accessing the information across the different platforms.

More specifically, simply having access to raw information on the source platform, from the target platform, is not sufficient. For example, metadata (data which describes the raw information format and location) is also typically needed. In addition, raw information on the source platform may be modified in a way that is transparent to applications that attempt to use the data in the target platform, creating further problems.

One specific problem in the prior art is that there is no acceptable method of accessing raw information relating to count key data ("CKD") during the above processes. Two reasons contribute to this fact. First, there is no logical format for MVS data set characteristics. And second, it is often required to modify the underlying raw information, such as for active VSAM files. Further, there are few if any devices that are available to both MVS and open system platforms.

It is also worth noting that transforming data from the source platform to the target platform takes considerable time, in accord with the prior art. Specifically, the prior art typically involves the following steps: READ->TRANSFORM->WRITE->READ->PROCESS. Accordingly, these steps also typically include: SETUP/SERIALIZE->READ->TRANSFORM->PROCESS. It is desirable to reduce the prior art process time, preferably by at least 50%.

One object of the invention is thus to provide systems and methods which transform source data from a source platform to a target platform in a single operation. Another object of the invention is to perform this operation in a time that is faster than the time currently available using prior art methods. Yet another object of the invention is to provide systems and methods for transmitting metadata between platforms and outside of the physical data path. These and other objects will become apparent in the description that follows.

SUMMARY OF THE INVENTION

U.S. Pat. Nos. 5,403,639 and 5,915,264 relate to snapshot operations and hardware for use with storage systems and provide useful background information for the invention. U.S. Pat. Nos. 5,403,639 and 5,915,264 are thus herein incorporated by reference.

In one aspect, the invention uses a snapshot facility (e.g., a disk subsystem supporting snapshot operations), inter-operating servers, and access of devices from non-native data paths to transform source data from a source platform to a target platform with a single copy. The source platform has a server and the target platform has a server communicating with one another. These platforms communicate with the snapshot facility to make a serialized copy of the source data for later use.

In another aspect, the invention provides certain methodology for making the single copy transformation. An application in the target platform first makes a data request of the source platform. The target platform forwards the request to the target platform server, which in turn communicates to the source platform server to request access to source data. A data management unit within the source platform determines the location of the desired data in the snapshot facility; and the source platform server specifies the source location to the target platform server. A data management unit within the target platform determines the potential target disk within the snapshot facility; and the target platform server specifies the target disks to the source platform server. At this point, a snapshot of the source data is taken to one or more target disks in the snapshot facility. The source platform server specifies the locations of the target disks, as well as source metadata, to the target platform server. These locations and metadata are forwarded to a data transformer within the target platform, which in turn specifies a data available signal to the original application. The application then makes a request for records to the data transformer, which reads source data from the snapshot facility. This read also transforms the data for return to the target platform.

Methodology such as described above thus reduces the elapsed time the customer needs to access the data, as a snapshot of the actual data, and the capture of the associated metadata, is performed in a single operation. The time to access data from one platform to another is reduced through use of the snapshot operations and the mapping I/O operations to a device to match that of the initiating data path. Unlike the prior art, intermediate and high overhead WRITE->READ steps have been replaced with a simple SETUP process described below, improving access time. The metadata associated with the source data is preferably transmitted between platforms and outside of the physical data path.

In one aspect, the invention provides for making an unalterable copy of the raw information with a "snapshot" copy of the information. Metadata is preferably extracted at the same time as the copy.

In another aspect, the invention provides a communication process to achieve the objectives of the invention in a MVS system communicating with a source platform such as a mainframe. As known to those in the art, a MVS system can be an IBM mainframe platform operating system with CKD-attached devices. Another aspect of the invention is to provide a communication process to achieve the objectives of the invention in an open system platform communicating with a source platform such as a mainframe. As known in the art, an open system platform can include, for example, Unix or Windows NT with SCSI attached devices. Upon request to access information in the mainframe, exchange devices are writable to MVS and readable to the open system, and the device receiving the snapshot copy is negotiated.

In yet another aspect, a server on the open system platform requests the MVS server to make an unalterable copy of the raw information (i.e., an MVS data set) to the negotiated device. The MVS server then makes a snapshot copy of the MVS data set, and the metadata is extracted at the time of the copy and returned to the initiator.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
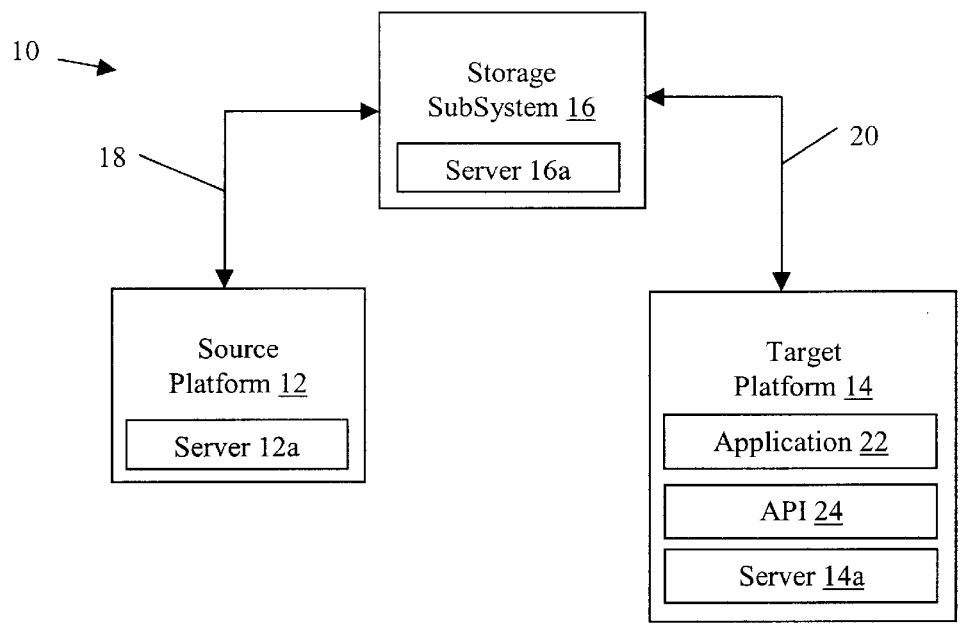
FIG. 1 shows a system constructed according to the invention for transforming data from a source platform to a target platform.

FIG. 1 shows a system 10 constructed according to the invention to transform data from a source platform 12 to a target platform 14 through a subsystem 16 (i.e., a facility with snapshot capability). Source platform 12 in FIG. 1 typically has the form of a mainframe (such as an IBM file system). Target platform 14 typically has the form of a computer operating in Windows, NT or Unix. Subsystem 16 can take the form of Storage Technology's Iceberg disk system, known in the art, as a snapshot facility. Data communication path 18 between source platform 12 and disk subsystem 16 thus typically is an ESCON data link, known in the art, supporting count key data ("CKD"). Data communication path 20 between subsystem 16 and target platform 14 is typically a SCSI link, also known in the art.

System 10 provides specific advantages over the prior art, particularly with respect to improved speed of data transfers between target platform 14 and source platform 12. Generally, source platform 12 produces data and transmits this data in the same form. According to the teachings herein, a snapshot is taken of source data to target disks within disk subsystem 16. Data transferred to target platform 14 is expected to arrive in same length units to conform to the SCSI standard. Subsystem 16 thus provides the desired data to target platform 14 in a series of fixed length sizes, as in a disk track image.

Target platform 14 includes an application 22 that desires to read or otherwise access the data in the source platform 12. Platform 14 has an API 24 (i.e., a software module) that facilitates communication, according to the techniques disclosed herein, between target platform 12 and subsystem 16.

Figure 4:
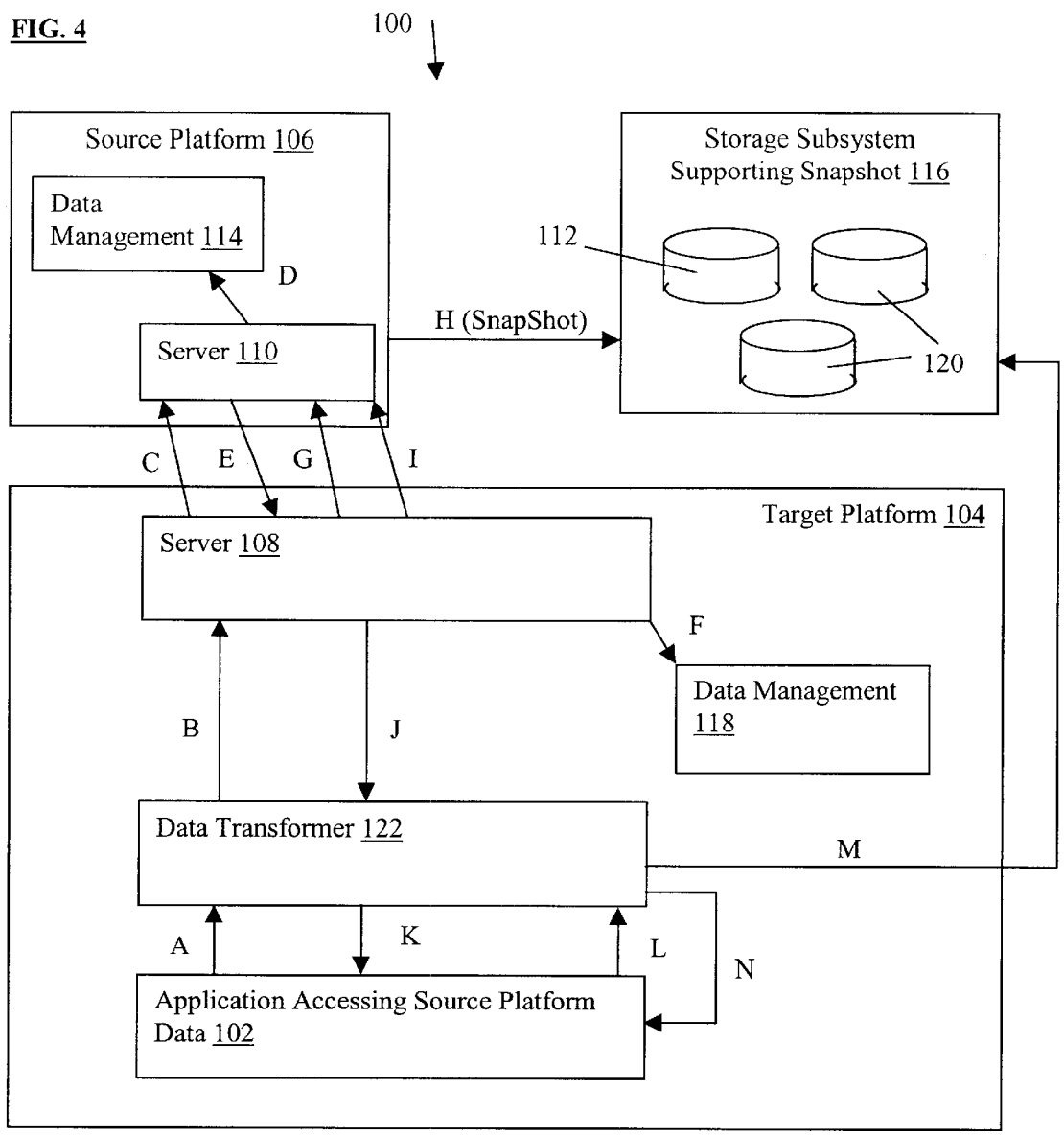
FIG. 4 illustrates an architectural schematic and flow chart for transforming data from a source platform to a target platform in accord with the preferred embodiment of the invention.

Source platform 12 and target platform 14 have servers 12a, 14a, respectively, to provide for communications between the two platforms 12, 14. Disk subsystem 16 also preferably includes a server 16a to acquire source data in its raw format. FIG. 4 illustrates functionality of servers 12a, 14a, 16a.

One particular advantage of the invention over the prior art involves communication between the mainframe and the host. In the prior art, this communication occurred through a network file transfer protocol ("FTP"), or similar facility, to facilitate the access and availability of a library of large files. Data for the mainframe was read in by FTP and sent, when requested, by FTP. However, FTP reads source data and metadata and only sends record data; and does not recognize the record information associated therewith. According to the invention, both record data and record information are available to the target platform with no intermediate transfer operation required.

Figure 2:
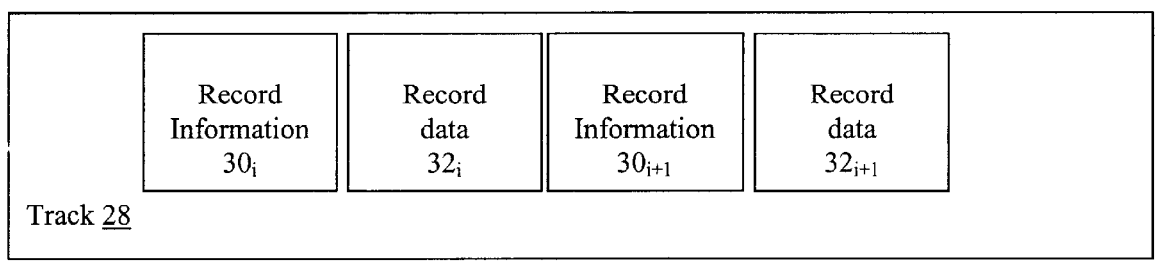
FIG. 2 illustrates a preferred arrangement of representative data blocks on a track for use with the system of FIG. 1.

In particular, the source data also has metadata defining certain characteristics about the source data. Since SCSI communications between disk subsystem 16 and target platform 14 expects a series of uniform data blocks, containing a maximum of 56-kbytes (the typical length of one mainframe disk track), system 10 breaks up the 56-kbytes of data into 512-byte data chunks, a typical minimum in the desired SCSI format. FIG. 2 illustrates one acceptable data track configuration 28. Specifically, data track 28 is a series of record information data chunks 30, shown illustratively as sequential data chunks $30_i$ and $30_{i+1}$, and a series of record data chunks 32, shown illustratively as sequential data chunks $32_i$ and $32_{i+1}$. The maximum size of any series of chunks 30, 32 is 56-kbytes. Those skilled in the art should appreciate that data track 28 is shown illustratively and that other sizes for data chunks 30, 32 can be used for a given maximum data series size corresponding to a disk track. For example, 256-byte data chunk sizes can be used.

Record information 30 has a minimum of 8 bytes for the count field. Key field is a minimum of 0 bytes, up to 256-bytes. 8 bytes is sufficient to define the record number of the disk track (e.g., 2 bytes for the cylinder, 2 bytes for the head, 1 byte for the record number in the track, 1 byte of key length, and 1 byte of data length).

Record data 32 provides information about the data, such as the length of the source data 32 and other useful information. Record data 30 is provided in raw CKD form (i.e., count+key). API 24, FIG. 1, understands that the record information 30 is not used as part of the source data.

Figure 3:
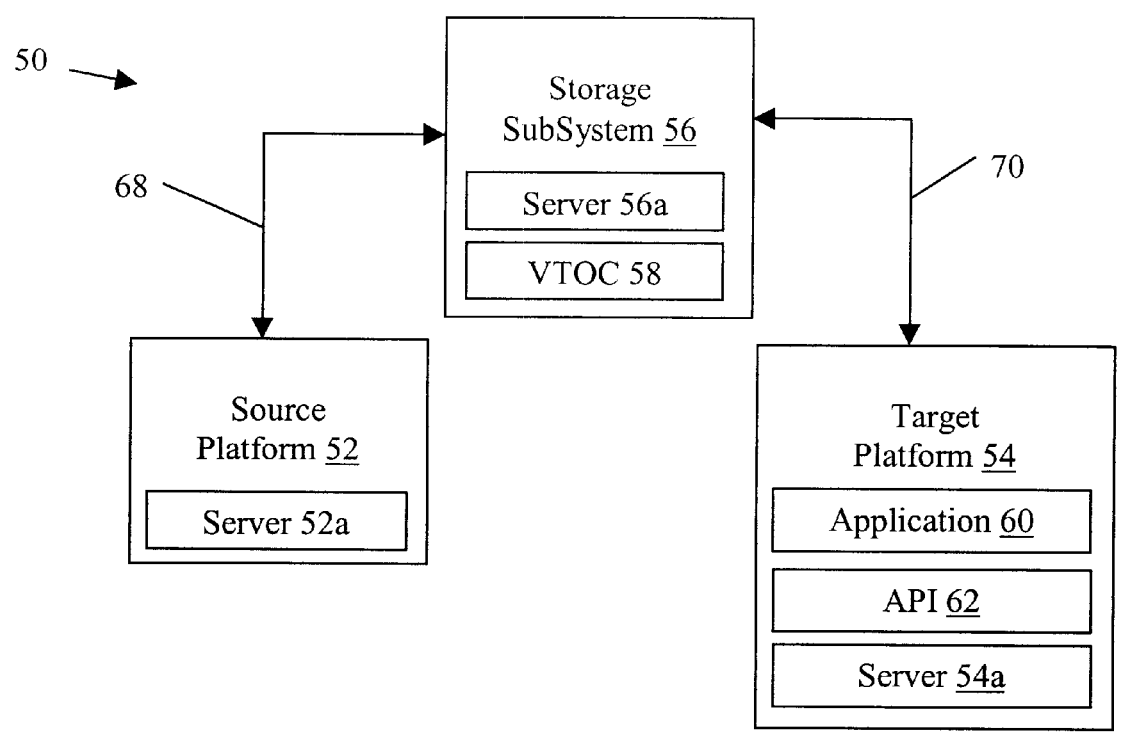
FIG. 3 shows an alternative system constructed according to the invention which uses volume table of contents for applications in the host.

FIG. 3 shows an alternative system 50 for transforming data from a source platform (e.g., a mainframe) to a target platform (e.g., a UNIX host) in a single operation. As above, source platform 52 produces data desired by application 60 in target platform 54, via storage subsystem 56; and servers 52a, 54a, 56a provide for communication therebetween. Subsystem 56 includes a volume table of contents ("VTOC") 58, known in the art, to provide metadata about the desired source data. By way of example, the metadata can define the start and end locations of the source data. API 62 reads VTOC 58 directly to acquire the metadata. This metadata is communicated to target platform 54 via SCSI link 70 in 512 data chunks, as above, with a certain allotment (e.g., 2–8 k) per data set depending upon whether the data is VSAM or non-VSAM data. The raw source data of source platform 52 is acquired as described above in connection with FIG. 1. The link between the source platform 52 and subsystem 56 is, again, preferably ESCON.

The first record on a data volume of FIG. 3 is the disk address of where the metadata resides. The first address of VTOC 58 is a description of VTOC 58. API 62 is typically about 25 k of object code residing in target platform 54 to read the record information. System 50 uses snapshot, residing in disk subsystem 56, to assure that the correct pointers are copied while source platform 52 serializes data to target platform 54.

FIG. 4 illustrates system architecture and a flow chart 100 for the preferred embodiment of the invention. An application 102 in the target platform 104 first makes a data request of the source platform 106, as step A. Target platform 104 forwards the request to the target platform server 108 in step B. Server 108 communicates to the source platform server 110 to request access to source data 112, in step C. A data management unit 114 within source platform 106 determines the location of the desired data in the snapshot facility 116, in step D; and source platform server 110 specifies the source location to target platform server 108, in step E. A data management unit 118 within target platform 106 determines the potential target disk(s) 120 within snapshot facility 116, in step F; and target platform server 108 specifies the target disks 120 to source platform server 110, in step G. At this point, in step H, a snapshot of source data 112 is taken to one or more target disks 120 in snapshot facility 116. In step 1, source platform server 110 specifies the locations of target disks 120, as well as source metadata, to target platform server 108. These locations and metadata are forwarded to a data transformer 122 within target platform 104, in step J, which in turn specifies a data available signal to the original application 102, in step K. Application 102 then makes a request for records to data transformer 122, in step L; and transformer 122 reads source 112 data from snapshot facility 116, in step M. This read also transforms the data for return to target platform 104, in step N.

The invention thus attains the objects set forth above, among those apparent from preceding description. Since certain changes may be made in the above systems and methods without departing from the scope of the invention, it is intended that all matter contained in the above description or shown in the accompanying drawing be interpreted as illustrative and not in a limiting sense.

In view of the foregoing, what is claimed is:

1. A method of transforming source data from a source platform to a target platform with a single copy, comprising the steps of:
   communicating a data request from the target platform to the source platform, wherein the step of communicating a data request comprises generating the data request from an application within the target platform;
   determining a location of the source data in a disk subsystem supporting snapshot;
   taking a snapshot of the source data, in raw form, to a target disk in the disk subsystem;
   communicating the location and target disk position to the target platform;
   and reading the source data from the disk subsystem to transform the source data to the target platform.

2. A method according to claim 1, wherein the step of determining the location of the source data comprises querying a data management unit within the source platform.

3. A method according to claim 1, wherein the step of communicating the data request comprises requesting access to the source data between communicating servers, the target platform and source platform each having a communicating server.

4. A method according to claim 3, further comprising specifying source data subsystems to the target platform via communication between the servers.

5. A method according to claim 1, wherein the step of communicating the location and target disk position further comprises communicating source metadata to the target platform.

6. A method according to claim 1, wherein the step of communicating the location and target disk position comprises informing the application that the source data is available.

7. A method according to claim 1, wherein the step of reading comprises communicating a request record through a data transformer in the target platform.

8. A method according to claim 1, further comprising ensuring data integrity through the snapshot.

9. A method of transforming source data from a source platform to a target platform with a single copy, comprising the steps of:
   communicating a data request from the target platform to the source platform, wherein the step of communicating the data request comprises requesting access to the source data between communicating servers, the target platform and source platform each having a communicating server;
   determining a location of the source data in a disk subsystem supporting snapshot;
   taking a snapshot of the source data, in raw form, to a target disk in the disk subsystem;
   communicating the location and target disk position to the target platform;
   reading the source data from the disk subsystem to transform the source data to the target platform; and
   determining the target disk in the disk subsystem via querying a data management unit in the target platform.

10. A method according to claim 9, further comprising specifying the target disk via a communication from the target platform server to the source platform server.

11. A system for transforming source data from a source platform to a target platform with a single copy, comprising:
    an application within the target platform for generating a request for the source data;
    a first communication server within the target platform and a second communication server within the source platform, the first communication server sending a request to the second communication server for access to the source data in response to the application request;
    a data transformer within the target platform for transforming the source data; and
    a snapshot facility to copy the source data to one or more target disks, wherein the source data at the target disks is transformed to the target platform through the data transform upon request by the application, wherein the source platform further comprises a second data management unit for determining a location of the source data within the disk subsystem upon receipt of a query from the second communication server.

12. A system according to claim 11, wherein the second communication server communicates return locations on the target disks and source metadata to the first communication server after the snapshot facility copies the source data to the target disks.

13. A system according to claim 11, wherein the snapshot facility further ensures data integrity.

14. A system for transforming source data from a source platform to a target platform with a single copy, comprising:
    an application within the target platform for generating a request for the source data;
    a first communication server within the target platform and a second communication server within the source platform, the first communication server sending a request to the second communication server for access to the source data in response to the application request;
    a data transformer within the target platform for transforming the source data; and
    a snapshot facility to copy the source data to one or more target disks wherein the source data at the target disks is transformed to the target platform through the data transform upon request by the application, wherein the target platform further comprises a first data management unit for determining positions of the target disks within the disk subsystem in response to a query from the first communication server.

* * * * *